US008917303B2

(12) United States Patent
Miyadera

(10) Patent No.: US 8,917,303 B2
(45) Date of Patent: Dec. 23, 2014

(54) OPTICAL WRITING DEVICE, IMAGE FORMING DEVICE, AND METHOD OF OPERATING THE SAME

(71) Applicant: Tatsuya Miyadera, Kanagawa (JP)

(72) Inventor: Tatsuya Miyadera, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/936,527

(22) Filed: Jul. 8, 2013

(65) Prior Publication Data

US 2014/0028773 A1       Jan. 30, 2014

(30) Foreign Application Priority Data

Jul. 27, 2012   (JP) ................. 2012-167540

(51) Int. Cl.
*B41J 2/45* (2006.01)
*B41J 2/435* (2006.01)
*G03G 15/043* (2006.01)
*G06K 15/12* (2006.01)

(52) U.S. Cl.
CPC .......... *G03G 15/043* (2013.01); *G06K 15/1247* (2013.01)
USPC ........... 347/238; 347/237; 347/247; 347/236; 347/118

(58) Field of Classification Search
USPC .......................... 347/118, 236, 238, 237, 247
See application file for complete search history.

(56) References Cited

U.S. PATENT DOCUMENTS

| 7,251,055 B2* | 7/2007 | Sawada et al. ............ 358/1.9 |
| 7,834,898 B2 | 11/2010 | Yamaguchi et al. |
| 8,294,744 B2* | 10/2012 | Kinoshita et al. ............ 347/234 |
| 8,411,124 B2* | 4/2013 | Kinoshita et al. ............ 347/247 |
| 2011/0043592 A1* | 2/2011 | Kinoshita et al. ............ 347/236 |
| 2012/0062681 A1 | 3/2012 | Miyadera et al. |
| 2012/0140013 A1* | 6/2012 | Komai et al. .................. 347/118 |
| 2012/0288291 A1 | 11/2012 | Miyadera et al. |
| 2013/0044176 A1 | 2/2013 | Shirasaki et al. |

FOREIGN PATENT DOCUMENTS

| JP | 2001-301232 | 10/2001 |
| JP | 2009-056795 | 3/2009 |
| JP | 2012-061675 | 3/2012 |

OTHER PUBLICATIONS

U.S. Appl. No. 13/919,261, filed Jun. 17, 2013.

* cited by examiner

*Primary Examiner* — Sarah Al Hashimi
(74) *Attorney, Agent, or Firm* — Oblon, Spivak, McClelland, Maier & Neustadt, L.L.P.

(57) ABSTRACT

The optical writing device includes: a light source including a plurality of light-emitting element assemblies; a line information storage for storing pixel information constituting an image; a light source driver for driving the light-emitting elements; an error information acquire for acquiring inclination error information and arrangement error information; a correction value generator for generating correction value information for correcting the inclination of the main scanning line; a correction value holder for holding the generated correction value information; and a driven pixel adjuster for adjusting positions in the sub-scanning direction, wherein the correction value generator generates the correction value information such that a position of the image to be shifted to correct the error of the arrangement of the light-emitting element assemblies is different from that to correct the inclination of the main scanning line.

9 Claims, 13 Drawing Sheets

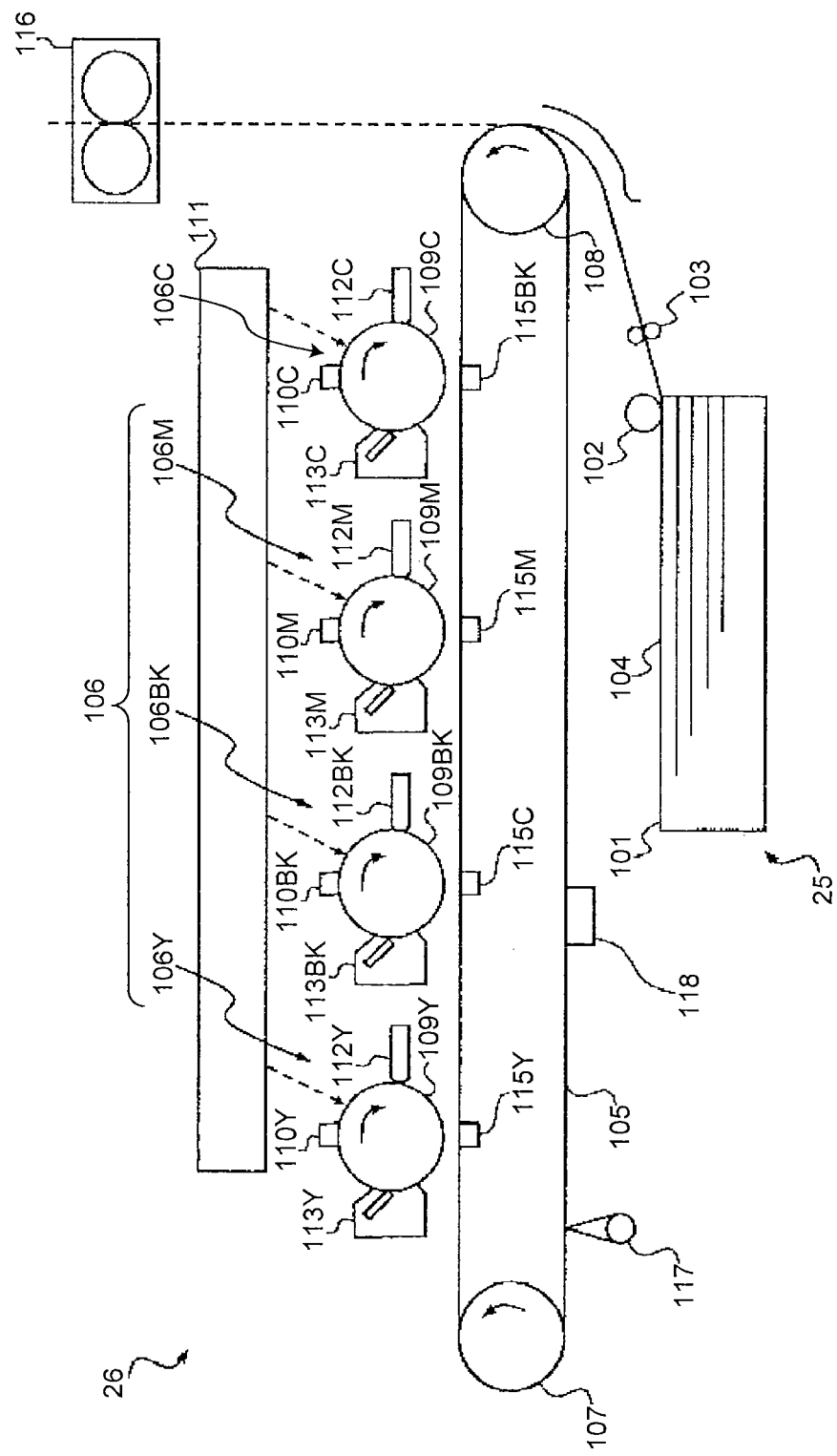

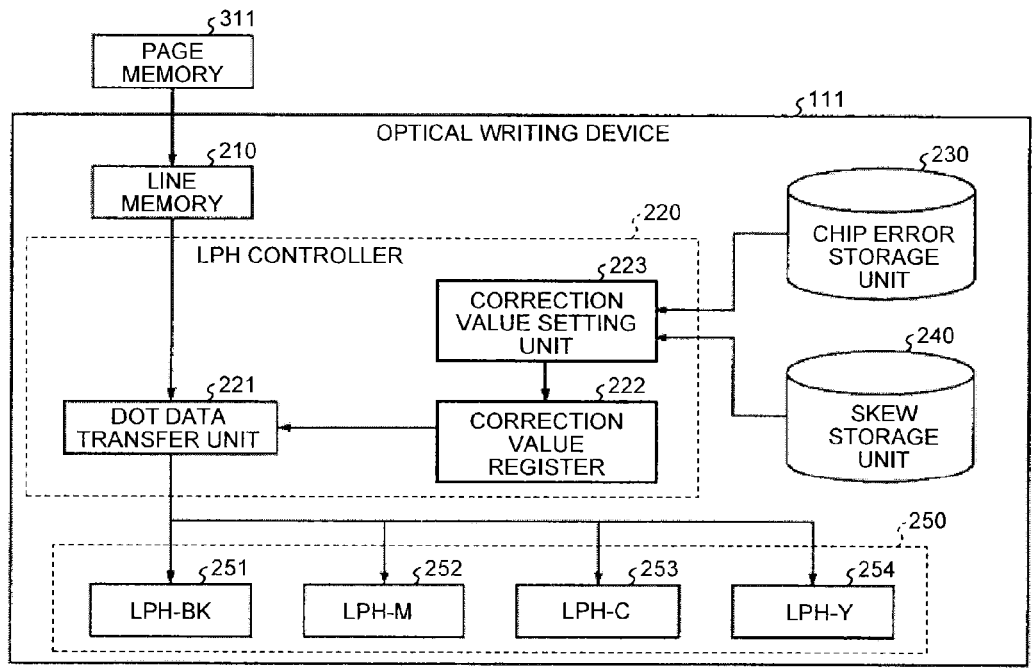

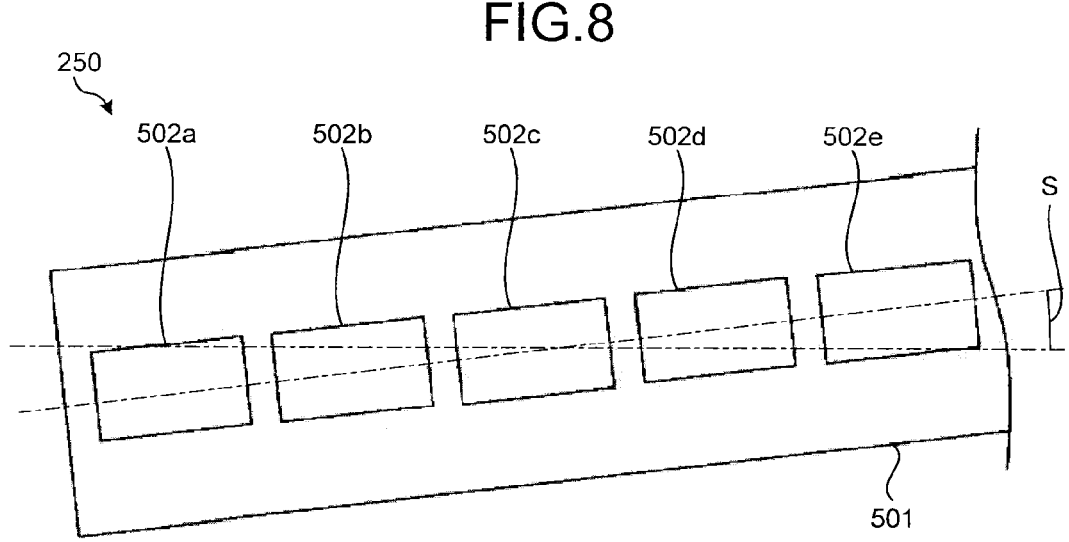

FIG.10A

| LIGHT SOURCE CHIP NUMBER | 01 | | 02 | | 03 | | 04 | | 05 | | 06 | | ... |
|---|---|---|---|---|---|---|---|---|---|---|---|---|---|
| DOT NUMBER | 01 | 97 | 01 | 97 | 01 | 97 | 01 | 97 | 01 | 97 | 01 | 97 | ... |
| WAVINESS CORRECTION VALUE | 0 | 0 | 0 | 0 | 1 | 0 | 0 | -1 | 0 | 0 | -1 | 0 | |

FIG.10B

| LIGHT SOURCE CHIP NUMBER | 01 | | 02 | | 03 | | 04 | | 05 | | 06 | | ... |
|---|---|---|---|---|---|---|---|---|---|---|---|---|---|
| DOT NUMBER | 01 | 97 | 01 | 97 | 01 | 97 | 01 | 97 | 01 | 97 | 01 | 97 | ... |
| SKEW CORRECTION VALUE | 0 | 0 | 0 | 0 | 1 | 0 | 0 | 0 | 0 | 1 | 0 | 0 | |

FIG.10C

| LIGHT SOURCE CHIP NUMBER | 01 | | 02 | | 03 | | 04 | | 05 | | 06 | | ... |
|---|---|---|---|---|---|---|---|---|---|---|---|---|---|
| DOT NUMBER | 49 | 145 | 49 | 145 | 49 | 145 | 49 | 145 | 49 | 145 | 49 | 145 | ... |
| SKEW CORRECTION VALUE | 0 | 0 | 0 | 0 | 1 | 0 | 0 | 0 | 0 | 1 | 0 | 0 | |

FIG.11

| LIGHT SOURCE CHIP NUMBER | 01 | | | | 02 | | | | 03 | | | | ... |
|---|---|---|---|---|---|---|---|---|---|---|---|---|---|
| DOT NUMBER | 01 | 49 | 97 | 145 | 01 | 49 | 97 | 145 | 01 | 49 | 97 | 145 | |
| WAVINESS CORRECTION VALUE | 0 | | 0 | | 0 | | 0 | | 1 | | 0 | | |
| SKEW CORRECTION VALUE | | 0 | | 0 | | 0 | | 0 | | 1 | | 0 | |

| | 04 | | | | 05 | | | | 06 | | | | |
|---|---|---|---|---|---|---|---|---|---|---|---|---|---|
| ... | 01 | 49 | 97 | 145 | 01 | 49 | 97 | 145 | 01 | 49 | 97 | 145 | ... |
| | 0 | | -1 | | 0 | | 0 | | -1 | | 0 | | |
| | | 0 | | 0 | | 0 | | 1 | | 0 | | 0 | |

FIG.12

| REGISTER NUMBER | BIT NUMBER | CORRESPONDING DOT NUMBER | | |
|---|---|---|---|---|
| 1 | 2 | 001 | ← WAVINESS CORRECTION | FIRST CHIP |
| 2 | 2 | 049 | ← SKEW CORRECTION | |
| 3 | 2 | 097 | ← WAVINESS CORRECTION | |
| 4 | 2 | 145 | ← SKEW CORRECTION | |
| 5 | 2 | 001 | ← WAVINESS CORRECTION | SECOND CHIP |
| 6 | 2 | 049 | ← SKEW CORRECTION | |
| 7 | 2 | 097 | ← WAVINESS CORRECTION | |
| 8 | 2 | 145 | ← SKEW CORRECTION | |
| 9 | 2 | 001 | ← WAVINESS CORRECTION | THIRD CHIP |
| 10 | 2 | 049 | ← SKEW CORRECTION | |
| 11 | 2 | 097 | ← WAVINESS CORRECTION | |
| 12 | 2 | 145 | ← SKEW CORRECTION | |
| ⋮ | | | | |

FIG.13

| REG [1:0] 2 BIT REGISTER | BIT [1] | 0: WITHOUT CORRECTION |
| --- | --- | --- |
| | | 1: WITH CORRECTION |
| | BIT [0] | 0: ONE LINE IN POSITIVE DIRECTION |
| | | 1: ONE LINE IN NEGATIVE DIRECTION |

FIG.16

| LIGHT SOURCE CHIP NUMBER | 01 | | | | | | 02 | | | | | | 03 | | | | | |
|---|---|---|---|---|---|---|---|---|---|---|---|---|---|---|---|---|---|---|
| DOT NUMBER | 01 | 25 | 49 | 97 | 120 | 145 | 01 | 25 | 49 | 97 | 120 | 145 | 01 | 25 | 49 | 97 | 120 | 145 |
| WAVINESS CORRECTION VALUE | 0 | 0 | 0 | 0 | 0 | 0 | 0 | 0 | 0 | 0 | 0 | 0 | 1 | 0 | | 0 | 0 | |
| SKEW CORRECTION VALUE | | | | | | | | | | | | | | | 1 | | | 0 |

| | 04 | | | | | | 05 | | | | | | 06 | | | | | |
|---|---|---|---|---|---|---|---|---|---|---|---|---|---|---|---|---|---|---|
| | 01 | 25 | 49 | 97 | 120 | 145 | 01 | 25 | 49 | 97 | 120 | 145 | 01 | 25 | 49 | 97 | 120 | 145 |
| | 0 | 0 | 0 | -1 | 0 | 0 | 0 | 0 | 0 | 0 | 0 | 0 | -1 | 0 | | 0 | 0 | |
| | | | | | | | | | | | | 1 | | | 0 | | | 0 |

FIG.17

| LIGHT SOURCE CHIP NUMBER | 01 | | | | | | 02 | | | | | | 03 | | | | | | ⋮ |
|---|---|---|---|---|---|---|---|---|---|---|---|---|---|---|---|---|---|---|---|
| DOT NUMBER | 01 | 33 | 65 | 97 | 129 | 161 | 01 | 33 | 65 | 97 | 129 | 161 | 01 | 33 | 65 | 97 | 129 | 161 | |
| WAVINESS CORRECTION VALUE | 0 | 0 | | 0 | 0 | | 0 | 0 | 0 | 0 | 0 | | 1 | 0 | | 0 | 0 | | |
| SKEW CORRECTION VALUE | | | 0 | | | 0 | | | | | | 0 | | | 1 | | | 0 | |

| LIGHT SOURCE CHIP NUMBER | 04 | | | | | | 05 | | | | | | 06 | | | | | | ⋮ |
|---|---|---|---|---|---|---|---|---|---|---|---|---|---|---|---|---|---|---|---|
| DOT NUMBER | 01 | 33 | 65 | 97 | 129 | 161 | 01 | 33 | 65 | 97 | 129 | 161 | 01 | 33 | 65 | 97 | 129 | 161 | |
| WAVINESS CORRECTION VALUE | 0 | 0 | | −1 | 0 | | 0 | 0 | | 0 | 0 | | −1 | 0 | | 0 | 0 | | |
| SKEW CORRECTION VALUE | | | 0 | | | 0 | | | 0 | | | 1 | | | 0 | | | 0 | |

OPTICAL WRITING DEVICE, IMAGE FORMING DEVICE, AND METHOD OF OPERATING THE SAME

CROSS REFERENCE TO RELATED APPLICATION

The present application claims a benefit of priority to and incorporates by reference the entire contents of Japanese Patent Application No. 2012-167540 filed in Japan on Jul. 27, 2012.

BACKGROUND OF THE INVENTION

1. Field of the Invention

The present invention relates to an optical writing device, an image forming device, and a method of controlling the same.

2. Description of the Related Art

In recent years, computerization of information is getting increased. An image processing device, for example, a scanner to transform document into information with an electronic form and a printer or a facsimile to output the information are well known. Such image processing devices is usually an MFP, which are provided with an image-capturing function, an image-forming function, a communication function, and the like, used as a printer, a facsimile, a scanner, and a copier.

Among image processing devices, an electro-photography image forming apparatus is widely used as an image forming apparatus. In an electro-photography image forming device, an electrostatic latent image is formed by exposing a photosensitive element. A toner image is formed by using a developing agent such as toner for the electrostatic latent image. Finally, the toner image is transferred onto a sheet.

In such electro-photography image forming device, an image to be output is divided into multiple lines, and image formation is performed for each line. Generally, an optical writing device, in which light-emitting elements corresponding to pixels are arranged for a main scanning line, exposes the photosensitive element for each line, thereby forming an electrostatic latent image. An LPH (Light-emitting diode Print Head) may be used as a light source for such optical writing device.

Unfortunately, the conventional optical writing device such as the LPH has an error associated with attaching to the image forming apparatus. The LPH is mechanically attached to the image forming apparatus. There are the cases where the LPH is attached to the image forming devise in an inclined manner relative to the defined position, and the attachment position is inclined due to operation vibration, temperature variation, or change over time. These are generally referred to as "skew". When the LPH inclines from the defined position, the output light of the light-emitting element is not accurately emitted onto an image-forming position on the photosensitive element exposed by the LPH. This leads to a degradation of a quality of the image, and a color deviation among colors of C (Cyan), M (Magenta), Y (Yellow), and K (black).

To solve the above disadvantages, Japanese Patent Laid-Open Publication No. 2012-061675 discloses a technique in which multiple main scanning division positions are set in advance and an image is shifted in the sub-scanning direction at the division position to correct the inclination. The image is shifted by shifting a line which is read at the division position when reading pixel information stored in a line memory for storing the pixel information for each main scanning line.

A generally-available LPH is constituted by implementing multiple semiconductor chips each including multiple integrated light-emitting elements on a substrate so as to satisfy the width in the main scanning direction. For example, light-emitting elements corresponding to 192 dots are integrated into a semiconductor chip at a pitch of 42.3 µm, and 26 pieces of semiconductor chips are implemented on a substrate to achieve a resolution of 600 dpi for A4 size.

As described above, in the LPH thus constituted, multiple light-emitting elements integrated into one semiconductor chip, and therefore, positional deviation between light-emitting elements in the semiconductor chip would not cause any problem. When multiple semiconductor chips are implemented on a substrate, positional deviation between semiconductor chips may occur. Therefore, not only the inclination of attachment of the LPH relative to the image forming device but also positional deviation between semiconductor chips in the LPH may cause problems such as degradation of the image quality, color deviation, and the like described above.

Even if such positional deviation between semiconductor chips in the LPH is corrected, inclination correction using shifting of the image as described above can be used. More specifically, on the basis of information indicating the state of positional deviation between semiconductor chips, the image is shifted in the sub-scanning direction at the division positions as described above. Such correction of the positional deviation between semiconductor chips is called waviness correction.

In this case, when both of the skew correction described above and the waviness correction are performed, the correction values of them both may overlap, and the correction amount, i.e., the shift amount, in the sub-scanning direction at a division position may increase. When the pixel information is read from the line memory and the correction amount in the sub-scanning direction is informed to a module controlling the light source, this is performed with a register provided for each of the division positions described above.

In this case, much correction amount is designated at a division position, and therefore, each of the registers is required to have many numbers of bits, and this leads to increase of the circuit scale and the production cost. When the correction amount at a division position is much, the image may be deformed in the portion. Therefore, the shift amount at a division position is desirably reduced to the minimum level as much as possible.

The problem as described above is not limited to the use of the LPH as the light source. The same problem would occur even when other type of light source is used to constitute a light source on a line.

Therefore, there is a need for reducing the shift amount at a shift position in an optical writing device that performs skew correction and waviness correction by shifting an image in a sub-scanning direction.

SUMMARY OF THE INVENTION

According to an aspect of the invention, an optical writing device for forming an electrostatic latent image by exposing an image carrier in an image forming apparatus is provided. The optical writing device includes: a light source including a plurality of light-emitting element assemblies arranged in a main scanning direction, each light-emitting element assemblies including a plurality of light-emitting elements arranged in the main scanning direction; a line information storage for storing pixel information constituting an image for each main scanning line along with the main scanning direction; a light source driver for driving the light-emitting elements, on the basis of the pixel information about the light-emitting elements; an error information acquire for acquiring inclination error information representing inclination of the main scanning line based on an error of attachment of the light source and arrangement error information representing an error of arrangement of the light-emitting element assemblies in the light source; a correction value generator for generating correction value information for correcting the inclination of the main scanning line based on the inclination error information and the arrangement error information thus acquired, by shifting the image at multiple positions on the main scanning line in a sub-scanning direction, the sub-scanning direction being perpendicular to the main scanning direction; a correction value holder for holding the generated correction value information in association with each of the multiple positions on the main scanning line; and a driven pixel adjuster for adjusting positions in the sub-scanning direction of the pixel information corresponding to the light-emitting elements, on the basis of the correction value information being held, wherein the correction value generator generates the correction value information such that a position of the image to be shifted on the main scanning line in the sub-scanning direction in order to correct the error of the arrangement of the light-emitting element assemblies is different from a position of the image to be shifted on the main scanning line in the sub-scanning direction in order to correct the inclination of the main scanning line based on inclination error information.

BRIEF DESCRIPTION OF THE DRAWINGS

FIG. 3 is a schematic side view illustrating a configuration of a print engine according to an embodiment of the present invention;

FIG. 4 is a block diagram illustrating a functional configuration of an optical writing device according to an embodiment of the present invention;

FIG. 5 is a conceptual diagram illustrating an example of a storage region of a line memory according to an embodiment of the present invention;

FIG. 8 is a schematic diagram illustrating an example of a skew in the LPH according to an embodiment of the present invention;

FIG. 9 is a conceptual diagram illustrating an example of information stored in a chip error storage unit according to an embodiment of the present invention;

FIG. 10A is a table illustrating an example of correction value information calculated based on waviness information according to an embodiment of the present invention;

FIGS. 10B and 10C are tables illustrating examples of correction value information calculated based on skew information according to an embodiment of the present invention;

FIG. 11 is a conceptual diagram illustrating an example of correction value information according to an embodiment of the present invention;

FIG. 12 is a conceptual diagram illustrating an example of configuration of a correction value register according to an embodiment of the present invention;

FIG. 13 is a conceptual diagram illustrating an example of a setting value in the correction value register according to an embodiment of the present invention;

FIG. 16 is a conceptual diagram illustrating an example of a correction value register according to another embodiment of the present invention; and FIG. 17 is a conceptual diagram illustrating an example of a correction value register according to another embodiment of the present invention.

DETAILED DESCRIPTION OF THE PREFERRED EMBODIMENT

Hereinafter, an embodiment of the present invention is described with reference to drawings. In this embodiment, an image forming device serving as a multifunction peripheral (MFP) is described for example. The image forming apparatus according to this embodiment includes an electro-photography image forming apparatus, and includes an optical writing device in which an LPH (Light emitting diode Print Head), i.e., a light-emitting body array made by connecting multiple light source chips in a main scanning direction, is used as a light source. LPH serves as an optical writing device for forming an electrostatic latent image on a photosensitive element which is an image carrier. In this embodiment, for example, an LED may be used as a light source. However, the type of light source is not limited thereto.

Figure 1:
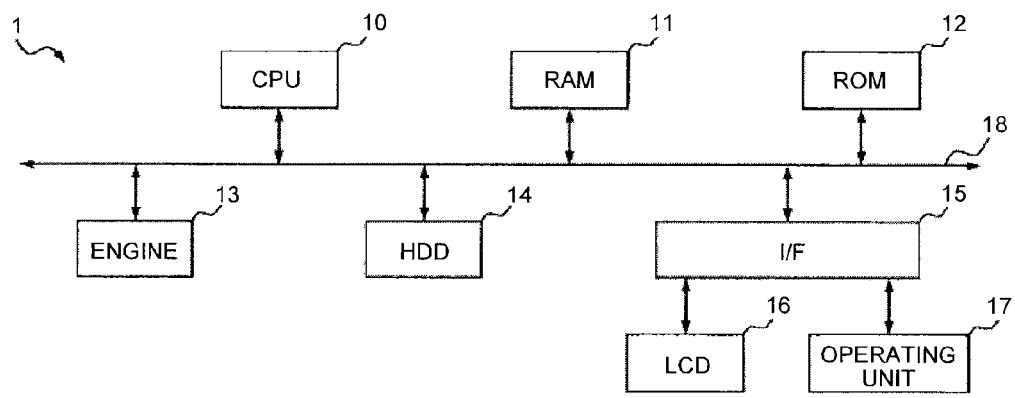
FIG. 1 is a block diagram illustrating a hardware configuration of an image forming device according to an embodiment of the present invention.

FIG. 1 shows a hardware configuration of an image forming apparatus 1 according to this embodiment. As illustrated in FIG. 1, the image forming device 1 according to this embodiment includes not only the same configuration as an information processing terminal such as a generally-available server and PC (Personal Computer), but also an engine for performing image-forming process. More specifically, the image forming apparatus 1 according to this embodiment includes a CPU (Central Processing Unit) 10, a RAM (Random Access Memory) 11, a ROM (Read Only Memory) 12, an engine 13, an HDD (hard Disk Drive) 14, and an I/F 15, which are connected via a bus 18. The I/F 15 is connected to an LCD (Liquid Crystal Display) 16 and an operating unit 17.

The CPU 10 is a calculating unit, and controls the entire operation of the image forming device 1. The RAM 11 is a volatile storage medium capable of reading and writing information at a high speed, and is used as a work area when the CPU 10 processes the information. The ROM 12 is a read-only nonvolatile storage medium, and stores programs such as firmware. The engine 13 is a mechanism for actually executing image-forming process in the image forming device 1.

The HDD 14 is a non-volatile storage medium capable of reading and writing information, and stores various kinds of the OS (Operating System), various kinds of control program, application programs, and the like. The I/F 15 connects and controls the bus 18, various kinds of hardware, a network, and the like. The LCD 16 is a visual user interface. The user can check the state of the image forming device 1 thereby. The operating unit 17 is a user interface, such as a keyboard and a mouse. The user can input information to the image forming device 1 thereby.

In such hardware configuration, the programs stored in the storage medium such as an optical disk (not shown), the ROM 12 or the HDD 14 are read to the RAM 11. The CPU executes the programs as a control software. Functional blocks achieving the functions of the image forming device 1 according to this embodiment are configured by combining the hardware and the software control unit.

Figure 2:
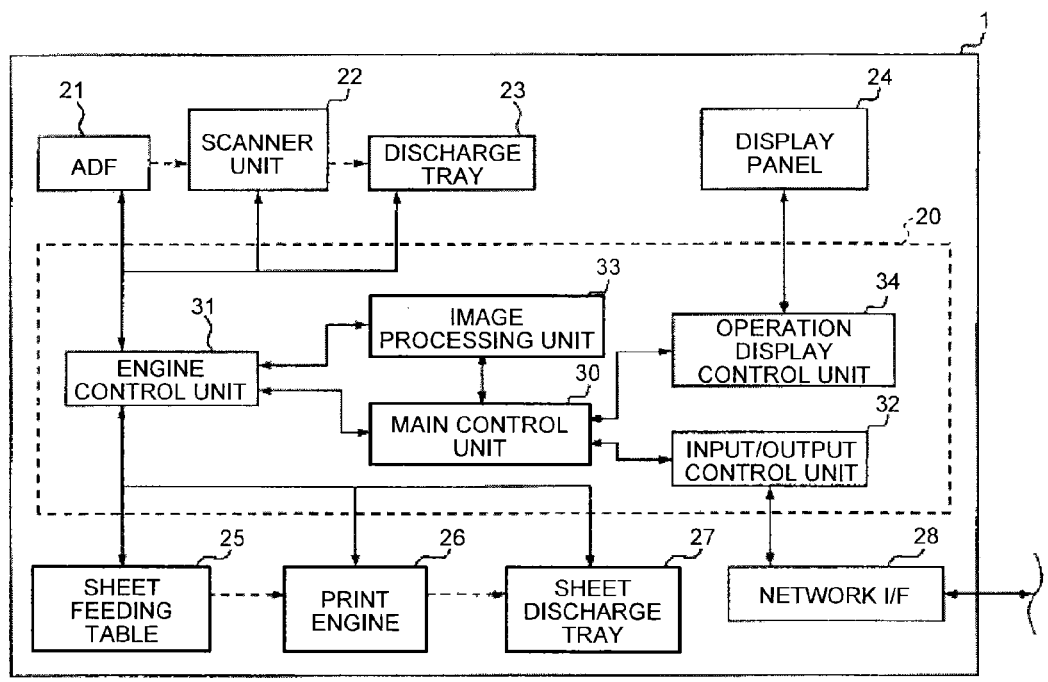
FIG. 2 is a block diagram illustrating a functional configuration of an image forming device according to an embodiment of the present invention.

With reference to FIG. 2, the functional configuration of the image forming device 1 according to this embodiment is described below. FIG. 2 shows a functional configuration of the image forming device 1 according to this embodiment. The image forming device 1 according to this embodiment includes a controller 20, an ADF (Auto Document Feeder) 21, a scanner unit 22, a discharge tray 23, a display panel 24, a sheet feeding table 25, a print engine 26, a discharge tray 27, and a network I/F 28.

The controller 20 includes a main control unit 30, an engine control unit 31, an input/output control unit 32, an image processing unit 33, and an operation display control unit 34. As illustrated in FIG. 2, the image forming device 1 according to this embodiment is configured as an MFP having a scanner unit 22 and a print engine 26. An electric connection is denoted as an arrow of a solid line, and a traveling of a sheet is denoted as an arrow of a broken line.

The display panel 24 is an output interface for visually displaying the state of the image forming device 1, and may be an input interface such as a touch panel. The user directly manipulates the image forming device 1 or inputs information to the image forming device 1 through the touch panel. The network I/F 28 is an interface the image forming device 1 communicates therethrough with another device via a network. For example, Ethernet (registered trademark) and a USB (Universal Serial Bus) interface are used as the network I/F 28.

The controller 20 may be configured by a combination of software and hardware. More specifically, the control programs such as firmware stored in the nonvolatile storage medium, for example an optical disk, the HDD 14, the ROM 12, and the nonvolatile memory, are loaded to volatile memory (hereinafter, simply referred to as memory) for example, the RAM 11. The controller 20 is configured as a combination of hardware such as an integrated circuit and control software executed by the CPU 10. The controller 20 functions so as to control the entire image forming device 1.

The main control unit 30 functions so as to control each unit included in the controller 20, and provide instructions to each unit of the controller 20. The engine control unit 31 functions so as to drive or control the print engine 26, the scanner unit 22, and the like.

The input/output control unit 32 provides signals and instructions input through the network I/F 28 to the main control unit 30. The main control unit 30 controls the input/output control unit 32 and accesses other devices through the network I/F 28.

The image processing unit 33 generates drawing information based on print information included in the received print job in accordance with the control by the main control unit 30. The drawing information includes information in which the print engine 26, which is the image-forming unit, draws an image to be formed in image-forming operation. The print information included in the print job includes image information converted into a format which the image forming device 1 can recognize by a printer driver installed to the information processing device such as a PC. The operation display control unit 34 notifies the main control unit 30 of information which is input via the display panel 24 or display information on the display panel 24.

When the image forming device 1 operates as a printer, first, the input/output control unit 32 receives a print job via the network I/F 28. The input/output control unit 32 transfers the received print job to the main control unit 30. When the main control unit 30 receives the print job, the main control unit 30 controls the image processing unit 33, and generates drawing information on the basis of the print information included in the print job. Generated drawing information is stored to a page memory in the engine control unit 31.

When the image processing unit 33 generates the drawing information, the engine control unit 31 causes the print engine 26 to perform image-forming process on a sheet conveyed from the sheet feeding table 25 based on the generated drawing information. More specifically, the print engine 26 functions as an image-forming unit. In the print engine 26, the optical writing device exposes the photosensitive drum to form an electrostatic latent image based on the drawing information stored in the page memory in the engine control unit 31. A toner image formed by developing the electrostatic latent image is transferred onto a sheet fed by the sheet feeding table 25, and thus, the image formation is completed. A document on which an image is formed by the print engine 26 is discharged to the discharge tray 27.

When the image forming device 1 operates as a scanner, the operation display control unit 34 or the input/output control unit 32 transfers a scan execution signal to the main control unit 30, in accordance with a scan execution command input from an external PC and the like via the network I/F 28 or command operated by the user with the display panel 24. The main control unit 30 controls the engine control unit 31 on the basis of the received scan execution signal.

The engine control unit 31 drives the ADF 21, and conveys the document, which is set on the ADF 21 to be captured, to the scanner unit 22. The engine control unit 31 drives the scanner unit 22, and captures the document conveyed from the ADF 21. When no document is set on the ADF 21, and a document is directly set on the scanner unit 22, the scanner unit 22 captures the document in accordance with the control of the engine control unit 31. More specifically, the scanner unit 22 operates as an image capturing unit.

In the image capturing operation, an image capturing device such as a CCD included in the scanner unit 22 optically scans the document, and generates captured image information which is generated on the basis of the optical information. The engine control unit 31 transfers the captured image information generated by the scanner unit 22 to the image processing unit 33. In accordance with the control of the main control unit 30, the image processing unit 33 generates image information on the basis of the captured image information received from the engine control unit 31. The image information generated by the image processing unit 33 is stored in a storage medium, for example an HDD 40, attached to the image forming device 1. More specifically, the scanner unit 22, the engine control unit 31, and the image processing unit 33 cooperate with each other and function as a document reading unit.

According to a command sent by the user, the image information generated by the image processing unit 33 is stored to the HDD 40 or the like as is, or the image information is transmitted to an external device through the input/output control unit 32 and network I/F 28. More specifically, the ADF 21 and the engine control unit 31 function as an image input unit.

When the image forming device 1 operates as a copier, the image processing unit 33 generates drawing information based on captured image information received by the engine control unit 31 from the scanner unit 22 or the image information generated by the image processing unit 33. The engine control unit 31 drives the print engine 26 similar to the printer operation based on the drawing information.

With reference to FIG. 3, the configuration of the print engine 26 according to this embodiment is described below. As illustrated in FIG. 3, the print engine 26 according to this embodiment has a tandem configuration in which the image-forming units 106 of a plurality of colors are arranged along a convey belt 105. More specifically, a plurality of image-forming units (106C, 106M, 106BK, 106Y), hereinafter collectively referred to as an image-forming unit 106, are arranged along the convey belt 105 in the stated order from the upstream. A plurality of image-forming units includes electro-photography processing units. The convey belt 105 consists of an intermediate convey belt on which an intermediate transfer image is formed so that the image is transferred onto a sheet of paper 104 as an example of storage medium. The paper 104 is separated and fed from a feeding tray 101 with a feeding roller 102.

The sheet 104 fed from the paper feed tray 101 is once stopped by a registration roller 103. The sheet 104 is fed to the transfer position of the image from the convey belt 105 in accordance with image-forming timing of the image-forming unit 106.

Multiple image-forming units (106C, 106M, 106BK, 106Y) have the same internal configuration except for the color of a formed toner image. The image-forming unit 106BK forms the image in the color of black. The image-forming unit 106M forms the image in the color of magenta. The image-forming unit 106C forms the image in the color of cyan. The image-forming unit 106Y forms the image in the color of yellow. In the description below, the image-forming unit 106C is exemplary described. The other image-forming units (106M, 106BK, 106Y) have the same constitute as the image-forming unit 106C, and therefore, description of the other image-forming units (106M, 106BK, 106Y) is omitted. The image-forming units 106 are distinguished by additional reference numerals C, M, BK, and Y.

The convey belt 105 consists of an endless belt stretched between a driving roller 107 rotationally driven and a driven roller 108. More specifically, it may be an endless belt. The driving roller 107 is rotated and driven by a driving motor (not shown). The driving motor, the driving roller 107, and the driven roller 108 function as a driving unit for moving the convey belt 105 which is an endless moving unit.

During image-forming process, the first image-forming unit 106C transfers a toner image in the color of cyan onto the convey belt 105 that is rotationally driven. The image-forming unit 106C includes a photosensitive drum 109C serving as a photosensitive element, a charger 110C arranged around the photosensitive drum 109C, an optical writing device 111, a developing unit 112C, a photosensitive element cleaner (not shown), a discharger 113C, and the like. The optical writing device 111 is configured to emit light onto each of the photosensitive drums (109C, 109M, 109BK, 109Y). Hereinafter, it is collectively referred to as "photosensitive drum 109".

During image-forming process, the external peripheral surface of the photosensitive drum 109C is uniformly charged by the charger 110C in the dark environment, and thereafter, writing process is performed using light corresponding to the image in the color of cyan, emitted from the light source in the optical writing device 111. Thus an electrostatic latent image is formed. The developing unit 112C makes the electrostatic latent image into a visible image with cyan toner, and accordingly, the toner image in the color of cyan is formed on the photosensitive drum 109C.

The toner image is transferred onto the convey belt 105 with the operation of the transfer device 115C at a position where the photosensitive drum 109C is in contact with or is in close to the convey belt 105. In this transfer process, the image using the cyan toner is formed on the convey belt 105. Then, the photosensitive element cleaner removes unnecessary toner remaining on the external peripheral surface of the photosensitive drum 109C that has completed the transfer process of the toner image, and thereafter, the discharger 113C removes electric charges. The photosensitive drum 109C stands by for a subsequent image-forming process.

As described above, the toner image in the color of cyan which is transferred onto the convey belt 105 by the image-forming unit 106C is moved to the subsequent image-forming unit 106M with the convey belt 105 driven with the rollers. By performing the same process as the image-forming process in the image-forming unit 106C, the image-forming unit 106M forms a magenta toner image on the photosensitive drum 109M, and the toner image in the color of magenta is transferred onto the toner image in the color of cyan so that the current color image is overlaid on the previous color image.

The convey belt 105 on which the images of the colors of cyan and magenta are transferred is further moved to the subsequent image-forming units 106BK, 106Y. By performing the same operation as the above mentioned image-forming process, the toner image in the color of black and the toner image in the color of yellow are transferred on the convey belt in this order in overlaying manner. Thus, a full color intermediate transfer image is formed on the convey belt 105.

The sheets 104 contained in the paper feed tray 101 are fed in such a way that the upper sheet 104 is first fed. The intermediate transfer image formed on the convey belt 105 is transferred onto the sheet at the position where the conveying path is in contact with or close to the convey belt 105. Thus, the image is formed on the sheet 104. The sheet 104 on which the image is formed is further conveyed, and the image is fixed by the fixing unit 116. Thereafter, the sheet 104 is discharged to the outside of the image forming device.

With reference to FIG. 4, the optical writing device 111 according to this embodiment is described. FIG. 4 shows a functional configuration of the optical writing device 111 according to this embodiment and connection relationship with a page memory 311 included in the engine control unit 31. As illustrated in FIG. 4, the optical writing device 111 according to this embodiment includes a line memory 210, an LPH controller 220, a chip error storage unit 230, a skew storage unit 240, an LPH-BK 251, an LPH-M 252, an LPH-C 253, and an LPH-Y 254.

The line memory 210 obtains and holds raster data stored in the page memory 311 for each of the main scanning lines. More specifically, the line memory 210 functions as a line information storage unit. FIG. 5 illustrates a holding mode of information in the line memory 210. As illustrated in FIG. 5, for nine lines from "n−4th" to "n+4th" (n is a natural number not less than 5), the line memory 210 holds dot data, i.e., pixel data for each pixel.

The LPH controller 220 drives the LPH-BK 251, the LPH-M 252, the LPH-C 253, and the LPH-Y 254 (hereinafter collectively referred to as LPH 250) in the optical writing device 111. The LPH controller 220 has a function of correcting "waviness" which means positional deviation between light source chips included in the LPH 250 and "skew" which means error in the attachment of the LPH 250 itself. As illustrated in FIG. 4, the LPH controller 220 includes a dot data transfer unit 221, a correction value register 222, and a correction value setting unit 223.

The dot data transfer unit 221 reads the dot data from the line memory 210, and transfers the dot data to the LPH 250. When the dot data transfer unit 221 reads the dot data from the line memory 210, the dot data transfer unit 221 reads the dot data while shifting the line in the line memory 210 from which the dot data are read at a predetermined position in the main scanning direction based on the correction value stored in the correction value register 222 to correct the skew and the positional deviation between the light source chips described above. More specifically, the dot data transfer unit 221 functions as a light source driving unit, and also functions as a driven pixel adjusting unit which adjusts a position in the sub-scanning direction of the pixel information for causing the light source to emit light.

As described above, the correction value register 222 includes a storage medium storing the correction value for correcting positional deviation and skew when the dot data transfer unit 221 reads the dot data from the line memory 210 and transfers the dot data to the LPH 250. The correction value stored in the correction value register 222 includes a value set by the correction value setting unit 223. More specifically, the correction value register 222 functions as a correction value holding unit.

The correction value setting unit 223 sets the correction value in the correction value register 222 on the basis of the information stored in the chip error storage unit 230 and the skew storage unit 240. The function of each unit included in the LPH controller 220 is one of the gist of this embodiment. The functions of the LPH controller 220 is described below. Similar to the controller 20 of the image forming device 1, the LPH controller 220 according to this embodiment is constituted by a combination of software and hardware.

Figure 6:
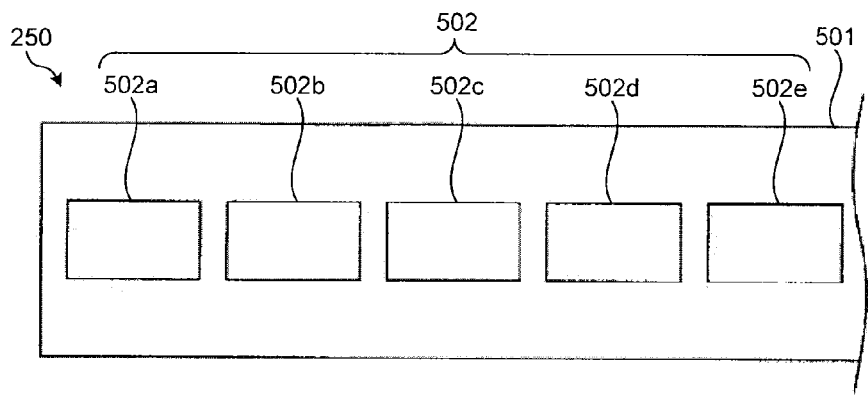
FIG. 6 is a schematic diagram illustrating a configuration of an LPH according to an embodiment of the present invention.

The LPH 250 is the light source for the optical writing device 111 according to this embodiment, and is provided for each of the colors of CMYK. As illustrated in FIG. 4, the LPH 250 includes the LPH-BK 251, the LPH-M 252, the LPH-C, and the LPH-Y 254. FIG. 6 shows a configuration of the LPH 250 according to this embodiment. FIG. 6 illustrates a front side view of a part of the light emitting surface of the LPH 250. FIG. 6 shows an example of LPH 250 in an ideal state without any positional deviation or skew between the light source chips described above.

As illustrated in FIG. 6, the LPH 250 includes multiple light source chips (502a, 502b, 502c, 502d, 502e). Hereinafter, they are collectively referred to as light source chip 502 mounted on a substrate 501. The substrate 501 is a base for holding multiple light source chips 502, and the multiple light source chips 502 are provided on the optical writing device 111 while they are mounted on the substrate 501. The multiple light source chips 502 are arranged along with the main scanning direction.

The multiple light source chips 502 are integrated semiconductor chips, and include multiple LEDs (Light emitting diodes), i.e., light-emitting elements, serving as light sources. The light source chips 502, therefore, constitute a light-emitting element assembly. The multiple LED devices included in each of the light source chips 502 are also arranged along with the main scanning direction. Each of the light source chips 502 according to this embodiment includes 192 LED devices along with the main scanning direction. Namely, LED devices equivalent to 192 dots are implemented on a chip. The LPH 250 according to this embodiment includes light source chips 502 arranged along with the main scanning direction. The LPH 250 according to this embodiment can emit a light having a resolution of 600 dpi in the main scanning direction and 2400 dpi in the sub-scanning direction.

Figure 7:
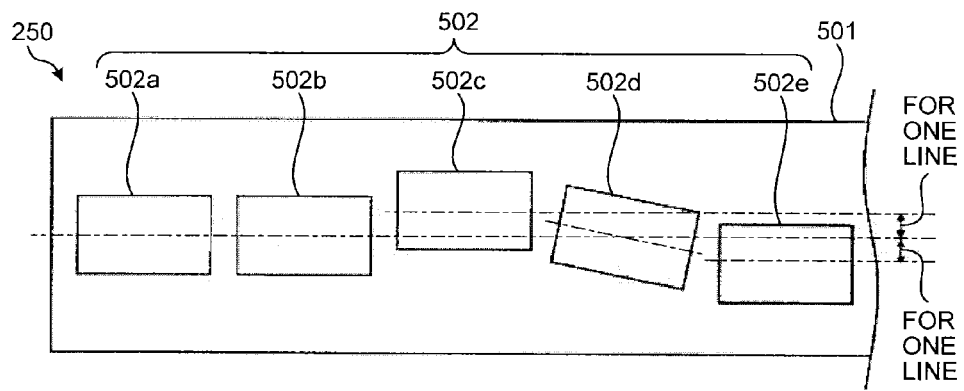
FIG. 7 is a schematic diagram illustrating an example of a positional deviation of a light source chip in the LPH according to an embodiment of the present invention.

FIG. 7 illustrates the LPH 250 with positional deviation between light source chips 502, i.e., "waviness." In the example of FIG. 7, the light source chips 502a and 502b are implemented in the ideal state. The light source chip 502c are upwardly shifted in a direction perpendicular to main scanning direction by one line relative to the ideal state. The light source chip 502d is inclined as well as shifted. The light source chip 502e is downwardly shifted in a direction perpendicular to main scanning direction by one line relative to the ideal state. FIG. 8 illustrates the LPH 250 with error in the attachment of the LPH 250 itself, i.e., "skew". In the example of FIG. 8, the LPH 250 is inclined by S degrees relative to the ideal direction.

In the production steps of the LPH 250, manufacturing tolerance as illustrated in FIG. 7 may occur. In the steps of assembling the LPH 250 to the optical writing device 111, manufacturing tolerance as illustrated in FIG. 8 may occur. when the skew and waviness described above is corrected, the correction value for the skew may interfere with that for the waviness. That introduces adverse influence on the image. According to this embodiment, such an interference is not caused.

The chip error storage unit 230 stores information about a positional deviation amount in the sub-scanning direction of each LED device (hereinafter referred to as chip error information), which is caused by positional deviation in the sub-scanning direction between light source chips 502 described in FIG. 7. In other words, the chip error storage unit 230 stores chip error information as arrangement error information of the light source chip 502, and functions as an arrangement error information storage unit. FIG. 9 illustrates an example of information stored in the chip error storage unit 230.

As illustrated in FIG. 9, the information stored in the chip error storage unit 230 according to this embodiment is coordinate information indicating the position of an LED device included in the LPH 250. In other words, the chip error storage unit 230 stores arrangement error information indicating error in the arrangement of an LED device. More specifically, in the chip error information according to this embodiment, the position of each LED device in the plane is represented by a coordinate system in which a predetermined point of the LPH 250 as illustrated in FIG. 7 is applied as a reference point. The chip error information as illustrated in FIG. 8 is generally provided by a manufacturer of the LPH.

The skew storage unit 240 stores information about the main scanning line when the LPH 250 is attached to the optical writing device 111 (hereinafter referred to as skew information). More specifically, the skew information stored in the skew storage unit 240 is angular information. Similar to the chip error storage unit 230, the skew storage unit 240 stores angular information about each of the LPH-BK 251, the LPH-M 252, the LPH-C 253, and the LPH-Y 254.

The skew information stored in the skew storage unit 240 is stored by measurement through the image forming device 1. In the method of measuring the skew information, first, an optical writing device 111 mounting the LPH 250 to be measured draws an electrostatic latent image of an image pattern for skew detection onto the photosensitive drum 109, thereby transferring a toner image obtained by developing the image pattern for skew detection onto the convey belt 105.

In this manner, the toner image of the image pattern for skew detection transferred on the convey belt 105 is read by a sensor for pattern detection arranged in a conveying path of the convey belt 105, and on the basis of the read result, the optical writing device 111 calculates the angle of the skew and stores it in the skew storage unit 240.

Alternatively, the image pattern for skew detection may be output onto a sheet, and a controller 20 may calculate inclination on the basis of a pattern included in image information generated by causing a scanner unit 22 to read the pattern on the output sheet, skew information may be stored on the basis of the calculation result.

As described above, the correction value setting unit 223 according to this embodiment sets the waviness correction value on the basis of the information stored in the chip error storage unit 230, and sets the skew correction value on the basis of the information stored in the skew storage unit 240. With reference to FIGS. 10A to 10C, each correction value calculated by the correction value setting unit 223 is described.

FIG. 10A shows an example of waviness correction values calculated on the basis of information about the chip error stored in the chip error storage unit 230. As illustrated in FIG. 10A, in the correction value setting unit 223 according to this embodiment, the number of dots of each of the light source chips 502 having light-emitting elements equivalent to 192 dots arranged in a line form is divided into half, and the first dot position and the 97-th dot position are applied as shift positions where the line shift described above is performed. More specifically, in this embodiment, the correction value setting unit 223 functions as an error information obtaining unit, and also functions as a correction value generating unit.

Then, the correction value setting unit 223 sets the correction values so that an output image for one line becomes closer to a linear shape on the basis of the position of each of the light source chips 502 stored in the chip error storage unit 230 as described with reference to FIG. 9.

For example, when the arrangement of the light source chips 502 as described with reference to FIG. 7 is used as an example, the third light source chip 502c is deviated upwardly relative to the light source chip 502a, and therefore, as illustrated in FIG. 10A, a correction value "1" is set for "01"-st dot of the third chip. The dot data transfer unit 221 reads dot data from the first chip in order. When reading the dot data for "01"-st dot of the third chip, the dot data transfer unit 221 shifts the main scanning line by one, and thereafter, reads the dot data for the shifted line from the line memory 210.

As illustrated in FIG. 7, the fourth light source chip 502d is arranged with an inclination. In this case, at the first dot of the fourth chip, large amount of deviation does not appear in the image at the same line as the third chip. As reading of the dots proceeds, the amount of deviation of the image in the fourth chip increases. For this reason, as illustrated in FIG. 10A, when the dot data for "97"-th dot of the fourth chip are read, the dot data transfer unit 221 shifts the main scanning line by one line in the direction opposite to deviation direction of the third chip, and thereafter, reads the dot data for shifted line from the line memory 210. The above shifting can reduce the deviation of the image in the sub-scanning direction.

In this embodiment, at the correction position every 96 dots as illustrated in FIG. 10A, the amount of shift is up to one line either in the upward or downward direction. Therefore, in view of the positional deviation amount for every light source chip 50 included in the LPH 250, it is preferable to select components to correct positional deviation at a correction position by less than two lines.

FIG. 10B shows an example of skew correction value calculated on the basis of the skew angle information stored in the skew storage unit 230. The skew correction value is obtained in the same manner as the waviness correction value. As illustrated in FIG. 10B, the correction value setting unit 223 divides the number of dots of each of the light source chips 502 into half, and applies skew correction for the first dot position and the 97-th dot position as line shift positions described above.

The skew of the LPH 250 as illustrated in FIG. 8 is exemplary described below. The deviation is as follows: as reading of the dots in the main scanning direction from the first chip in order, the image is gradually deviated in the sub-scanning direction. In this case, as illustrated in FIG. 10B, the correction value setting unit 223 sets the shift amount as one line every five shift position, e.g., the "01"-st dot in the third chip is set as "1" and the "97"-th dot in the fifth chip is set as "1". Accordingly, the dot data transfer unit 221 reading dot data for chip from the first chip in order shifts the main scanning line by one line every five shift position, and then reads the dot data for shifted line from the line memory 210.

The correction value setting unit 223 combines the waviness correction values and the skew correction values and writes it in the correction value register 222, thus setting the correction value. As illustrated in FIGS. 10A and 10B, referring to the "01"-st dot of the third chip, the waviness correction amount and the skew correction amount are "1." Combination of the correction value for the "01"-st dot of the third chip would be "2."

When such correction value is applied, the correction value register 222 requires the number of bits capable of shift correction by two lines at each correction position. This leads to increasing of the circuit scale. Even if the shift amount for shifting by two lines is allowed at a correction position, the image would be greatly deviated at that portion, thereby reducing the image quality.

In order to prevent such disadvantage, the correction value setting unit 223 according to this embodiment divides the number of dots of each of the light source chips 502 having light-emitting elements equivalent to 192 dots arranged in line into four portions. The correction value setting unit 223 applies the waviness correction to the first dot position and the 97-th dot position as shift positions. As illustrated in FIG. 10C, the correction value setting unit 223 applies the skew correction to the 49-th dot position and the 145-th dot position as shift positions. Therefore, this can prevent from overlapping of the image shift for the waviness correction and the image shift for the skew correction, and thus the shift amount at a shift position is able to be less than two lines.

FIG. 11 shows a state obtained by combining the waviness correction value as illustrated in FIG. 10A and the skew correction value as illustrated in FIG. 10C. As illustrated in FIG. 11, the shift amount of the third chip is distributed into the "01"-st dot and the "49"-th dot, and two lines shifting is not performed at a shift position.

In other words, as illustrated in FIGS. 10A to 10C, the correction value setting unit 223 according to this embodiment generates the correction value for the waviness correction amount and the correction value for the skew correction amount in a predetermined interval along the main scanning line, and applies the correction value for the waviness and the correction value for the skew alternatively in a half of the predetermined interval. Therefore, the correction value setting unit 223 according to this embodiment sets each correction values so that the position where the waviness correction is performed is different from the position where the skew correction is performed, along the main scanning line.

The configuration of the correction value register 222 for enabling the setting of the correction values as illustrated in FIG. 11 is described below. FIG. 12 shows the register configuration of the correction value register 222 according to this embodiment. As illustrated in FIG. 12, the correction value register 222 according to this embodiment includes a register value for correcting the position in the sub-scanning direction every 48 dots in the main scanning direction in the LED devices included in the LPH 250.

In this embodiment, as illustrated in FIG. 12, bit number of each register is two. The correction value register 222 according to this embodiment has registers for the LPH-BK 251, the LPH-M 252, the LPH-C 253, and the LPH-Y 254.

With reference to FIG. 13, the setting values in the correction value register 222 according to this embodiment are described below. FIG. 13 shows the contents of the setting values of each register as illustrated in FIG. 12. As illustrated in FIG. 13, one of the two bits indicates whether the position of the corresponding dot should be corrected or not. The other of the two bits indicates whether the shifted direction of the corresponding dot is positive or negative relative to the sub-scanning direction, when the position of the corresponding dot should be corrected. In this case, the positive direction means an upward and parallel to the sub-scanning direction, and the negative direction means a downward and parallel to the sub-scanning direction.

As described above, even if both of the skew correction and the waviness correction are performed, the LPH controller 220 according to this embodiment can prevent from performing the shift correction by not less than two lines at a correction position. As a result, increasing of the circuit size can be avoided when the number of bits is two at each shift position included in the correction value register 222. Also, this can prevent degradation of images by reducing the shift amount at a correction position.

Figure 14:
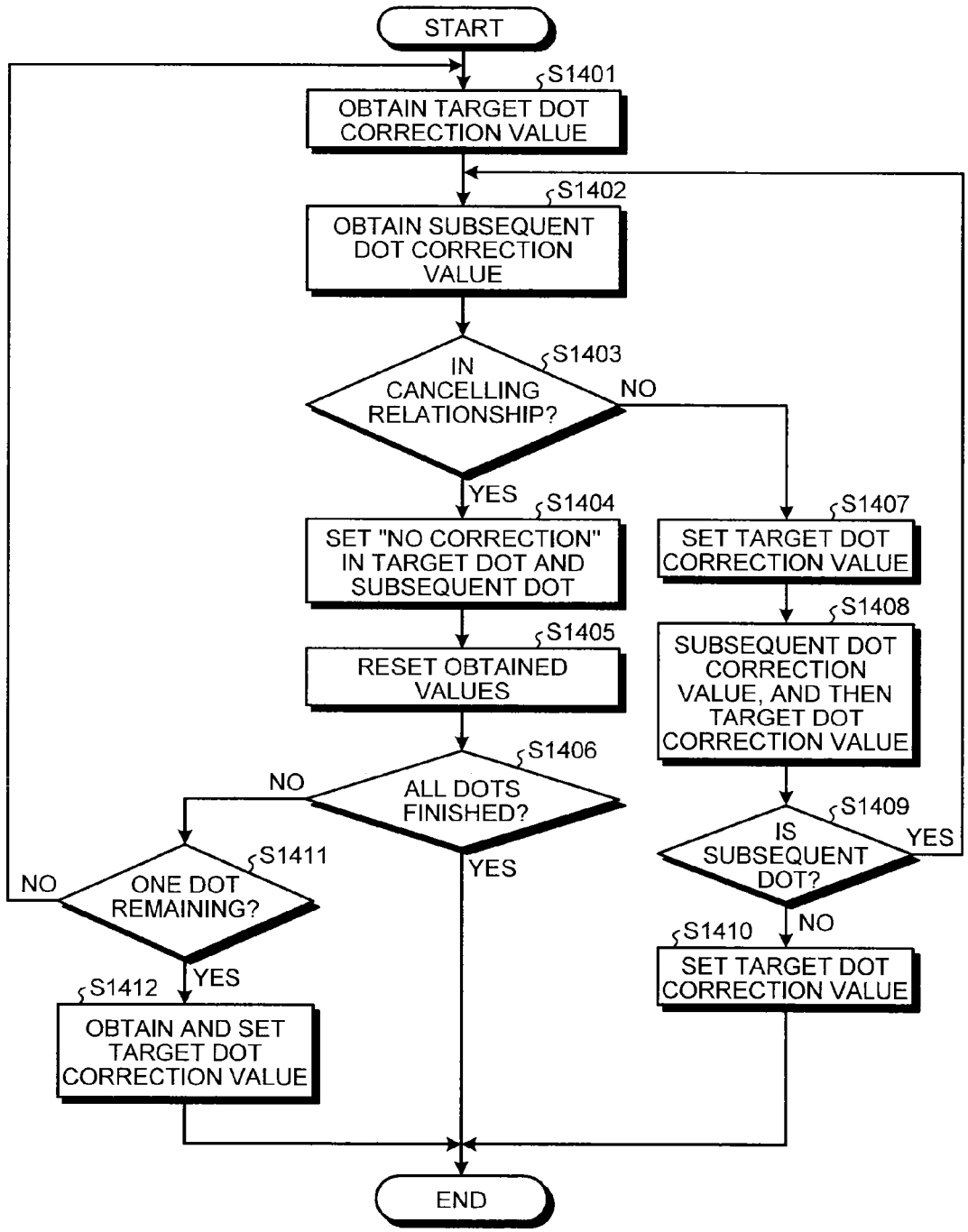
FIG. 14 is a flowchart of operation according to an embodiment of the present invention.

A setting operation of the correction value by the correction value setting unit 223 according to this embodiment is described below. FIG. 14 is a flowchart illustrating setting operation of correction values according to this embodiment. As illustrated in FIG. 14, as described with reference to FIGS. 10A, 10C, and 11, the correction value setting unit 223 obtains the calculated correction value as a target dot correction value, starting from the "01"-st dot of the first chip (S1401). The correction value setting unit 223 obtains a correction value for a dot subsequent to the target dot as a subsequent dot correction value (S1402).

When the correction value of the "01"-st dot of the first chip is obtained in S1401, the correction value setting unit 223 obtains the "49"-th dot of the first chip in S1402. When the correction value of the "145"-th dot of the first chip is obtained in S1401, the correction value setting unit 223 obtains the "01"-st dot of the second chip in S1402.

When the target dot correction value and the subsequent dot correction value are obtained, the correction value setting unit 223 determines whether the relationship between the target dot correction value and the subsequent dot correction value is cancelling each other or not (S1403). The "cancelling relationship" in S1403 means any one of the target dot correction value and the subsequent dot correction value is "1" and the other one of the target dot correction value is "−1", i.e., the direction of waviness correction value is different from the direction of skew correction value each other.

In such relationship, image shift in one of the directions in the sub-scanning direction occurs as the correction value for the waviness correction, and image shift in the other of the directions in the sub-scanning direction occurs as the correction value for the skew correction. In such relationship, as illustrated in FIG. 11, the positive and the negative are cancelled when the correction values for both of the waviness correction and the skew correction are combined without dividing the shift positions of the waviness correction and the skew correction. When the waviness correction and the skew correction are performed at different shift positions according to this embodiment, the positive and the negative are not cancelled and remain.

In order to avoid such state, when the correction values at adjacent shift positions are in cancelling relationship, the correction value setting unit 223 according to this embodiment sets the correction values of them both as "0", so that the correction values are cancelled with each other. Accordingly, this can prevent occurrence of local deviation in the image.

In this embodiment, a determination as to whether the correction values are cancelled by comparing the correction values at adjacent shift positions or not. Conventionally, such cancelling occurs only when the shift positions overlap each other. For this reason, instead of making determination as to the adjacent shift positions, cancellation may be determined only with a combination of shift positions which originally overlap each other. In such a case, the combination of shift positions which originally overlap each other is, e.g., the "01"-st dot and the "49"-th dot or the "97" dot and the "145" dot in each chip.

When it is determined to be in the cancelling relationship as a result of determination in S1403 (S1403/YES), the correction value setting unit 223 sets "no correction" in the registers for the target dot and the subsequent dot (S1404), and resets obtained values for the target dot and the subsequent dot (S1405). As a result, when register resetting has been done for all the dots (S1406/YES), the register setting operation for all the correction values are terminated.

When register resetting has not yet been done for all the dots (S1406/NO), the correction value setting unit 223 determines whether there remains only one dot of which register is not yet set (S1411). As a result, when there remains only one dot of which register is not yet set (S1411/YES), the correction value setting unit 223 obtains the target dot correction value for the remaining dot, and sets the register value (S1412), and terminates the processing. On the other hand, there remains two or more dots (S1411/NO), the correction value setting unit 223 repeats the processing in S1401 and subsequent steps while a subsequent dot of which register value is not yet set is applied as the target dot.

On the other hand, when it is determined not to be in the cancelling relationship as a result of the determination in S1403 (S1403/NO), the correction value setting unit 223 sets the target dot correction value in the register (S1407), and applies the obtained subsequent dot correction value as the target dot correction value (S1408). As a result, when there is not more subsequent dot which is to be obtained (S1409/NO), the correction value setting unit 223 sets, in the register, the target dot correction value that has been stored in place of the subsequent dot correction value in S1408 (S1410), and terminates the processing. When there still is a subsequent dot which is to be obtained (S1409/YES), the correction value setting unit 223 repeats the processing in S1402 and subsequent steps.

The register setting operation of the correction values according to this embodiment is finished as described above. As described above, according to the optical writing device 111 according to this embodiment, when the image is shifted in the sub-scanning direction to correct the waviness and the skew, the shift amount at an image shift position is caused to be equivalent to one line. The image shift corresponding to the waviness and the image shift corresponding to the skew are performed at different positions in the main scanning direction.

Therefore, according to the optical writing device 111 according to this embodiment, the shift amount at an image shift position is not two lines, and the shift amount at a shift position is reduced, whereby the number of bits in the register is reduced, and the increase in the size of the circuit scale can be avoided. In addition, the shift amount per image shift is increased, and deformation of the image can be avoided.

In the above embodiment, for example, the image shift amount at an image shift position is one line, and the image shift amount at an image shift position is prevented from being two or more. But this is merely an example. When the image shift corresponding to the waviness and the image shift corresponding to the skew are done at different positions in the main scanning direction, the effect of reducing the shift amount at a shift position can be achieved.

In the above embodiment, as described with reference to FIG. 5, the line memory 210 includes a storage region for holding dot data for nine lines. But this is merely an example. The number of lines in the dot data which can hold by the line memory 210 is preferably determined in accordance with the positional deviation amount of the LED device which may occur in the LPH 250.

The skew that may occur when the LPH 250 is attached to the optical writing device 111 can be estimated from mechanical manufacturing tolerance. Moreover, the deviation between light source chips 502 of the LPH 250, i.e., the waviness, is identified as the specification of the LPH. On the basis of two pieces of information, it is possible to identify the upper limit of the positional deviation amount of the LED device which may occur in the LPH 250. Therefore, the number of lines in the dot data which can hold by the line memory 210 can be determined in accordance with the positional deviation amount of the LED device identified on the basis of the two pieces of information described above.

In the above embodiment, as illustrated in FIG. 4, for example, the chip error information provided by the manufacturer of the LPH is stored to the chip error storage unit 230 which is a storage region provided in the optical writing device 111. Therefore, when the optical writing device 111 is assembled, the chip error information provided by the manufacturer of the LPH needs to be input into the chip error storage unit 230. In this case, if incorrect chip error information, e.g., chip error information about a different LPH 250, is input, then incorrect positional deviation correction would be performed.

In contrast, when the LPH 250 has a storage medium, and the storage medium stores chip error information, then the correction value setting unit 223 can read the chip error information from the storage medium provided in the LPH 250. In this case, it is not necessary to perform input operation of information as described above, and incorrect chip error information would not be applied. Accordingly, the above problem can be solved.

In the above embodiment, as described with reference to FIGS. 10A to 10C and 11, the minimum unit of the shift correction amount is one line. Alternatively, the minimum unit of the shift correction amount would be a fraction of which denominator is an integer such as half of the line and one third of the line.

The dot data transfer unit 221 can multiply the frequency with which the LPH 250 is controlled to emit light, read the pixel data stored in the line memory 210 for one line for an integer number of times, so that a fraction of which denominator can be applied as the minimum unit of the shift correction amount. For example, when half of the line is applied as the minimum unit of the shift correction amount, the dot data transfer unit 221 controls light emission of the LPH 250 at a frequency twice as high, and reads pixel data for one line from the line memory 210 for two cycles. With such processing, the image shift amount at an image shift position can be further reduced, and the deviation of the image at the image shift position can be reduced. As described above, the frequency with which the dot data transfer unit 221 controls light emission of the LPH 250 is 2400 dpi. Therefore, the resolution of the original image information in the sub-scanning direction is 1200 dpi.

Figure 15:
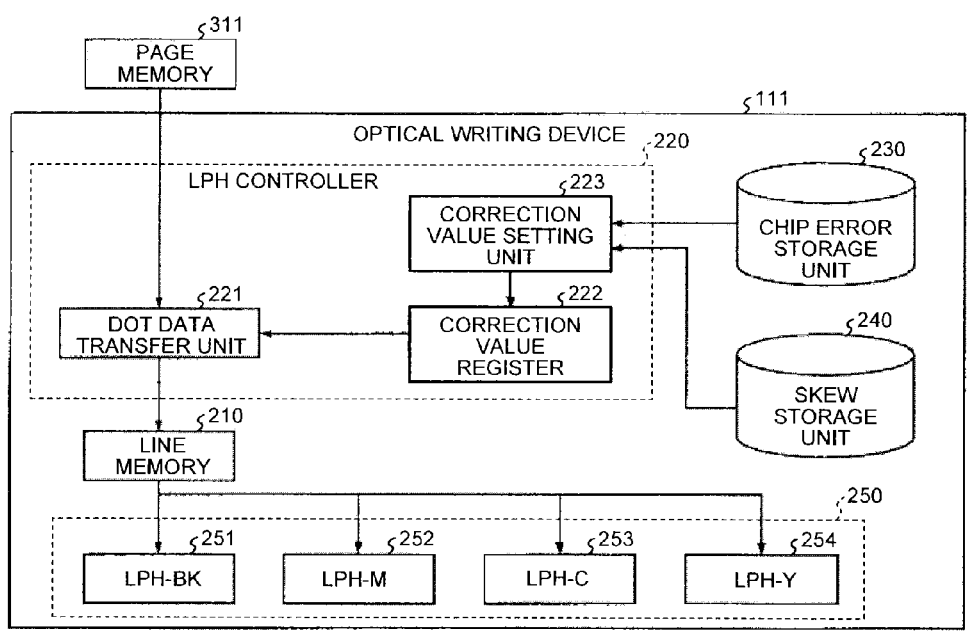
FIG. 15 is a block diagram illustrating a functional configuration of an optical writing device according to an embodiment of the present invention.

In the above embodiment, for example, when the dot data are read from the line memory 210, the LPH controller 220 performs the positional deviation correction. Alternatively, the positional deviation correction may be performed before the dot data read from the page memory 311 are written to the line memory 210. FIG. 15 shows a functional configuration of the optical writing device 111 when the positional deviation correction is performed before the dot data are written to the line memory 210.

The functional configuration included in the optical writing device 111 as illustrated in FIG. 15 is the same as the functional configuration as described with reference to FIG. 4, and the connection relationship between the functions are different from that of the first embodiment. More specifically, the optical writing device 111 according to FIG. 15 is different from the first embodiment in that the LPH controller 220 is provided between the page memory 311 and the line memory 210.

In accordance With the configuration as illustrated in FIG. 15, the waviness correction and the skew correction can be performed before the dot data read from the page memory 311 are written to the line memory 210. As a result, the dot data written to the line memory 210 are made into data of which positional deviation has already been corrected, and the dot data can be input into the LPH 250 as they are. With such configuration, the same effects as those of the first embodiment can be obtained.

In the above embodiment, for example, as illustrated in FIG. 4 or 15, the LPH controller 220 included in the optical writing device 111 includes the positional deviation correction function. Alternatively, before raster image are stored to the page memory 311, the positional deviation correction may be performed. In this case, the functions of the dot data transfer unit 221, the correction value register 222, the correction value setting unit 223, the chip error storage unit 230, and the skew storage unit 240 are provided in the image processing unit 33 or the engine control unit 31 in the controller 20. With this configuration, the same effects as the above can be obtained. In this case, the chip error storage unit 230 and the skew storage unit 240 may be provided in the optical writing device 111, and the controller 20 may read information from the optical writing device 111.

In the above embodiment, as described with reference to FIGS. 10A and 10B, for example, the waviness correction amount and the skew correction amount are generated with the same interval on the main scanning line. This is merely an example. The interval with which the waviness correction amount is generated in the main scanning line and the interval with which the skew correction amount is generated in the main scanning line may be different from each other.

For example, the skew correction amount is generated to be correct the deviation amount in the sub-scanning direction due to a predetermined skew angle in a shared manner throughout the main scanning line. Therefore, even when using the minimum unit of the shift amount in the sub-scanning direction such as one line and half of the line, the resolution of the shift position on the main scanning line required to correct the deviation amount in the sub-scanning direction due to the predetermined skew angle may not be high.

In contrast, the waviness correction amount needs to be generated in accordance with the inclination and the arrangement error of the light source chip 502, and therefore, it is necessary to set the shift amount at least on every unit, i.e., the number of light-emitting elements included in the light source chip 502 or a fraction of which numerator is the number of light-emitting elements and of which denominator is an integer. Therefore, when the position on the main scanning direction where the correction value for the waviness correction amount is set is different from the position on the main scanning direction where the correction value for the skew correction amount is set, the setting interval of the correction value on the main scanning line with the waviness correction amount may be different from the setting interval of the correction value on the main scanning line with the skew correction amount.

As described above, when the interval on the main scanning line with which the waviness correction amount is generated is caused to be different from the interval on the main scanning line along which the skew correction amount is generated. As illustrated in FIG. 16, the waviness correction amount and the skew correction amount are arranged with 48 dots interval, and the waviness correction amount may be further divided and the correction value can be set with 24 dots interval. More specifically, the frequency on the main scanning line can be different between the waviness correction amount and the skew correction amount.

As illustrated in FIG. 17, the setting intervals of the correction values of all the waviness correction amounts and skew correction amounts may be every 32 dots, and a correction value for skew correction amount may be set for two correction values for waviness correction amounts. As illustrated in FIGS. 16 and 17, in addition to a case where the frequency of the waviness correction is higher than the frequency of the skew correction, the following case is also possible: the frequency of the skew correction is higher than the frequency of the waviness correction.

In the above embodiment, for example, the LEDA using the LEDs as the light-emitting elements is used as the light source for forming an electrostatic latent image by exposing the photosensitive drum 109. But this is merely an example. The embodiment can be applied in the same manner when using an array-formed light source in which light-emitting elements are arranged in the main scanning direction. Examples of light-emitting elements used in this case include various kinds of light emitting elements such as an organic EL (Electro Luminescence) device, a laser diode device, a field emission cold cathode device, and the like, and the same effects as the above can also be obtained.

In the above embodiment, "1" of the waviness correction amount and the skew correction amount described with reference to FIGS. 10A to 10C indicates shifting of an image by one line at a corresponding position in the main scanning direction. This "one line" is equal to one line of the light emission cycle of the LPH 250. As described above, the light emission cycle of the LPH 250 is 2400 dpi. Accordingly, when calculating the waviness correction amount and the skew correction amount, it is necessary to calculate the correction amount in accordance with the light emission cycle of the LPH 250. More specifically, the correction value setting unit 223 calculates the waviness correction amount and the skew correction amount in accordance with the light emission cycle of the LPH 250

Alternatively, the light emission cycle of the LPH 250 may be changed in accordance with the resolution in the sub-scanning direction which the waviness correction amount and the skew correction amount calculated by the correction value setting unit 223 are based on. In this case, the dot data transfer unit 221 obtains the resolution in the sub-scanning direction, which the waviness correction amount and the skew correction amount are based on, from the correction value setting unit 223 or the correction value register 222, and controls the LPH 250 with a light emission cycle in accordance with the resolution. According to the present invention, the shift amount at a shift position can be reduced in an optical writing device that performs skew correction and waviness correction by shifting an image in a sub-scanning direction. Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical writing device for forming an electrostatic latent image by exposing an image carrier in an image forming apparatus, comprising:
   a light source including a plurality of light-emitting element assemblies arranged in a main scanning direction, each light-emitting element assembly including a plurality of light-emitting elements arranged in the main scanning direction;
   a line information storage for storing pixel information constituting an image for each main scanning line along with the main scanning direction;
   a light source driver for driving the light-emitting elements, on the basis of the pixel information about the light-emitting elements;
   an error information acquire for acquiring inclination error information representing inclination of the main scanning line based on an error of attachment of the light source and arrangement error information representing an error of arrangement of the light-emitting element assemblies in the light source;
   a correction value generator for generating correction value information for correcting the inclination of the main scanning line based on the inclination error information and the arrangement error information thus acquired, by shifting the image at multiple positions on the main scanning line in a sub-scanning direction, the sub-scanning direction being perpendicular to the main scanning direction;
   a correction value holder for holding the generated correction value information in association with each of the multiple positions on the main scanning line; and
   a driven pixel adjuster for adjusting positions in the sub-scanning direction of the pixel information corresponding to the light-emitting elements, on the basis of the correction value information being held,
   wherein the correction value generator generates the correction value information such that a position of the image to be shifted on the main scanning line in the sub-scanning direction in order to correct the error of the arrangement of the light-emitting element assemblies is different from a position of the image to be shifted on the main scanning line in the sub-scanning direction in order to correct the inclination of the main scanning line based on inclination error information, and
   wherein the correction value generator generates shift information indicating a shift of the image in the sub-scanning direction on the basis of each of the inclination error information and the arrangement error information every first interval along with the main scanning line, and generates the correction value information by alternately applying the shift information generated on the basis of each of the arrangement error information and the inclination error information every second interval that is a half of the first interval.

2. The optical writing device set forth in claim 1, wherein the correction value generator generates shift information indicating a shift of the image in the sub-scanning direction in association with the position on the main scanning line for shifting the image in the sub-scanning direction, and generates the shift information so that a frequency on the main scanning line of the shift information generated based on the arrangement error information is different from a frequency on the main scanning line of the shift information generated based on the inclination error information.

3. The optical writing device set forth in claim 1, wherein when the image indicated by two successive pieces of shift information applied alternately have different shift direction from each other, the correction value generator generates the correction value information so as to cancel the shift of the image based on the two successive pieces of shift information.

4. The optical writing device set forth in claim 1, wherein the correction value generator generates the correction value information in accordance with a cycle, the light source driver controlling light emission of the light-emitting elements thereby.

5. The optical writing device set forth in claim 1, wherein the light source driving unit controls light emission of the light-emitting elements with a cycle in accordance with a resolution in the sub-scanning direction, the correction value generator generating the correction value information therewith.

6. The optical writing device set forth in claim 1, wherein when the light source driver reads the pixel information from the line information storage in order to drive the light-emitting elements, the driven pixel adjuster adjusts the position in the sub-scanning direction of the pixel information on the basis of the pixel position adjustment information being held.

7. The optical writing device set forth in claim 1, wherein when the line information storage stores the pixel information, the driven pixel adjuster adjusts the position in the sub-scanning direction of the pixel information on the basis of the pixel position adjustment information being held.

8. An image forming apparatus comprising the optical writing control device set forth in claim 1.

9. A method of operating an optical writing device including a light source including a plurality of light-emitting element assemblies arranged in a main scanning direction, each light-emitting element assembly including a plurality of light-emitting elements arranged in the main scanning direction, the method comprising:
   storing pixel information in a line information storage constituting an image for each main scanning line along with the main scanning direction;
   driving the light-emitting elements by a light source driver on the basis of the pixel information about the light-emitting elements;
   acquiring inclination error information representing inclination of the main scanning line based on an error of attachment of the light source and arrangement error information representing an error of arrangement of the light-emitting element assemblies in the light source;
   generating correction value information for correcting the inclination of the main scanning line based on the inclination error information and the arrangement error information thus acquired, by shifting the image at multiple positions on the main scanning line in a sub-scanning direction, the sub-scanning direction being perpendicular to the main scanning direction;
   holding the generated correction value information in association with each of the multiple positions on the main scanning line; and
   adjusting positions in the sub-scanning direction of the pixel information corresponding to the light-emitting elements, on the basis of the correction value information being held,
   wherein the generating of correction value information generates shift information indicating a shift of the image in the sub-scanning direction on the basis of each of the inclination error information and the arrangement error information every first interval along with the main scanning line, and generates the correction value information by alternately applying the shift information generated on the basis of each of the arrangement error information and the inclination error information every second interval that is a half of the first interval.

* * * * *